(12) United States Patent
Schulze et al.

(10) Patent No.: US 6,823,891 B2
(45) Date of Patent: Nov. 30, 2004

(54) COMPRESSOR SUCTION REED VALVE

(75) Inventors: Scott D. Schulze, Troy, OH (US); Brad A. Schulze, Minster, OH (US); Donald C. Draper, Sidney, OH (US); Kevin J. Gehret, Fort Loramie, OH (US)

(73) Assignee: Copeland Corporation, Sidney, OH (US)

( * ) Notice: Subject to any disclaimer, the term of this patent is extended or adjusted under 35 U.S.C. 154(b) by 64 days.

(21) Appl. No.: 10/374,388

(22) Filed: Feb. 25, 2003

(65) Prior Publication Data

US 2004/0163713 A1 Aug. 26, 2004

(51) Int. Cl.⁷ .............................................. F16K 15/16
(52) U.S. Cl. ...................... 137/512; 137/855; 417/569
(58) Field of Search ................. 137/512, 855, 137/856, 857; 417/569, 571

(56) References Cited

U.S. PATENT DOCUMENTS

| | | | |
|---|---|---|---|
| 886,045 A | | 4/1908 | Ehrlich |
| 1,834,589 A | | 12/1931 | Holdsworth |
| 1,852,033 A | | 4/1932 | Summers |
| 2,996,155 A | | 8/1961 | Priesemuth |
| 3,509,907 A | * | 5/1970 | Gannaway .................. 137/512 |
| 4,193,424 A | | 3/1980 | Hrabal |
| 4,368,755 A | | 1/1983 | King |
| 4,445,534 A | | 5/1984 | King |
| 4,469,126 A | | 9/1984 | Simpson |
| 4,470,774 A | | 9/1984 | Chambers |
| 4,478,243 A | | 10/1984 | King |
| 4,543,989 A | | 10/1985 | Lorson |
| 4,548,234 A | | 10/1985 | Prenger |
| 4,642,037 A | | 2/1987 | Fritchman |
| 4,643,139 A | | 2/1987 | Hargreaves |
| 4,696,263 A | | 9/1987 | Boyesen |
| 4,729,402 A | | 3/1988 | Blass et al. |
| 4,854,839 A | * | 8/1989 | DiFlora ....................... 417/571 |
| 4,875,503 A | | 10/1989 | Heger et al. |
| 4,955,797 A | * | 9/1990 | Cowen .......................... 418/15 |
| 4,978,285 A | * | 12/1990 | Da Costa ..................... 417/569 |
| 5,016,669 A | | 5/1991 | Jamieson |
| 5,192,200 A | | 3/1993 | Lilie et al. |
| 5,213,125 A | | 5/1993 | Leu |
| 5,277,556 A | | 1/1994 | van Lintel |
| 5,934,305 A | | 8/1999 | Cho |
| 6,044,862 A | | 4/2000 | Schumann et al. |
| 6,164,334 A | | 12/2000 | Wallis |

* cited by examiner

*Primary Examiner*—Ramesh Krishnamurthy
(74) *Attorney, Agent, or Firm*—Harness, Dickey & Pierce, P.L.C.

(57) ABSTRACT

A suction reed valve includes a central ring shaped body having a pair of tabs extending radially outward. One of the pair of tabs is fixed to a valve plate and the other tab is free to move. A necked down region is located between the fixed tab and the central ring shaped body to facilitate the bending/deflection of the suction reed valve.

14 Claims, 3 Drawing Sheets

COMPRESSOR SUCTION REED VALVE

FIELD OF THE INVENTION

The present invention relates generally to pressure responsive valve assemblies. More particularly, the present invention relates to pressure responsive valve assemblies which include suction reed valves. The valve assemblies are adapted for use in reciprocating piston type compressors, such as refrigeration type compressors.

BACKGROUND OF THE INVENTION AND SUMMARY OF THE INVENTION

Reciprocating piston type compressors typically employ suction and discharge pressure activated valving mounted at the end of the cylinder housing. When designing these valve assemblies, it is of critical importance to the operation of the overall system to provide a sufficiently large port area in order to permit the flow of a maximum amount of gas within a given time period and with an acceptably small pressure drop. This is particularly true for refrigeration compressors employed in air conditioning systems because of the high mass flow rates generally required in such systems.

Associated with and conflicting with the desirability to maximize port area for a given cylinder size, is the need to reduce the weight of the moving valve member. The reduction of the weight of the moving valve member will lead to a reduction of the inertial effect of the valve and the reduction of the noise level associated with the opening and closing of the valve.

Another import design objective is to minimize the re-expansion or clearance volume of the cylinder. The valving system and the cylinder end top end wall should have a shape which is complimentary with the shape of the piston to reduce the volume of the compression chamber to a minimum when the piston is at top dead center of its stroke without restricting gas flow. While it may be possible to accomplish this objective by designing a complex piston head shape, manufacturing of this complex shape becomes excessively expensive, the assembly becomes more difficult and throttling losses generally occur as the piston approaches top dead center. This leaves the design for the valving system as the only means for designing a high-flow valving system which minimizes the re-expansion volume.

A typical suction reed includes a circular body which is used to cover a circular suction port in a valve plate. A pair of tabs extend radially outwardly from the circular section to provide means for attaching the suction reed to the valve plate. As the piston drops in the cylinder bore, the volume of the cylinder increases thus creating a vacuum in the bore. This vacuum pulls down the suction reed causing the suction reed to bend or deflect to open the suction port. While the suction reed is in this bent or deflected position, gas flows into the cylinder. Typically one of the tabs is riveted or otherwise secured to the valve plate to define a fixed side while the other tab is free to move when the compressor operates to define a free end side.

The shape or configuration of the reed affects how much the reed will deflect. The reed can be designed to provide the maximum flexibility for the reed, which will then create the best performance because it will open more to allow the maximum gas flow. The problem with this maximum flexibility design is that it creates the worst stress because generally, the more the reed moves, the more stress the reed experiences. Conversely, the reed can be designed to provide the best stress resistance but this will cause a diminishment in the performance of the compressor.

The present invention provides the art with a reed design that has been optimized to provide the best flow characteristics while still possessing good resistance to both bending and impact stresses. The size of the reed outside diameter (OD), the inside diameter (ID), thickness, neck shape, neck down radius and clamp line location have been designed to create a unique reed that provides low stress to the reed while providing enough flexibility for the reed to allow for good performance of the compressor.

In addition to the flexibility and bending stress design considerations for the reed of the present invention, the unique reed design of the present invention is also designed to account for impact stress. If the reed OD/ID ratio is made too large (i.e. the ring portion of the reed is too wide), the reed will be too stiff and it will not deflect enough to provide adequate gas flow. If the reed OD/ID ratio is made too small (i.e. the ring portion of the reed is too narrow), the impact stress on the reed will be too high and the reed will fracture. The unique reed of the present invention is designed with an optimal OD/ID ratio to create a reed that has superior performance.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
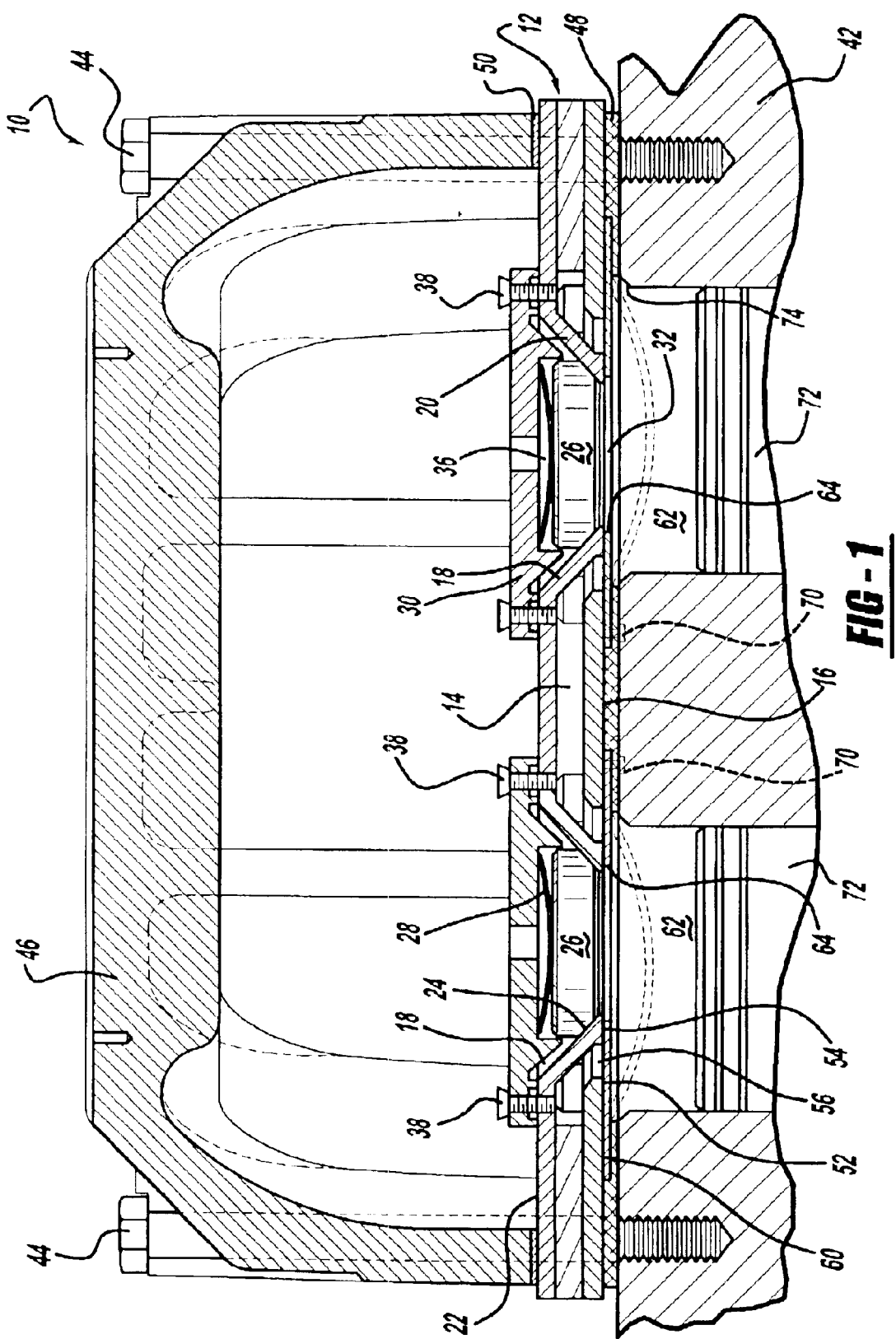
FIG. 1 is a partial sectional view of the valve assembly incorporating a uniquely shaped reed in accordance with the present invention where each cylinder is shown rotated 90° about a central axis.
Figure 2:
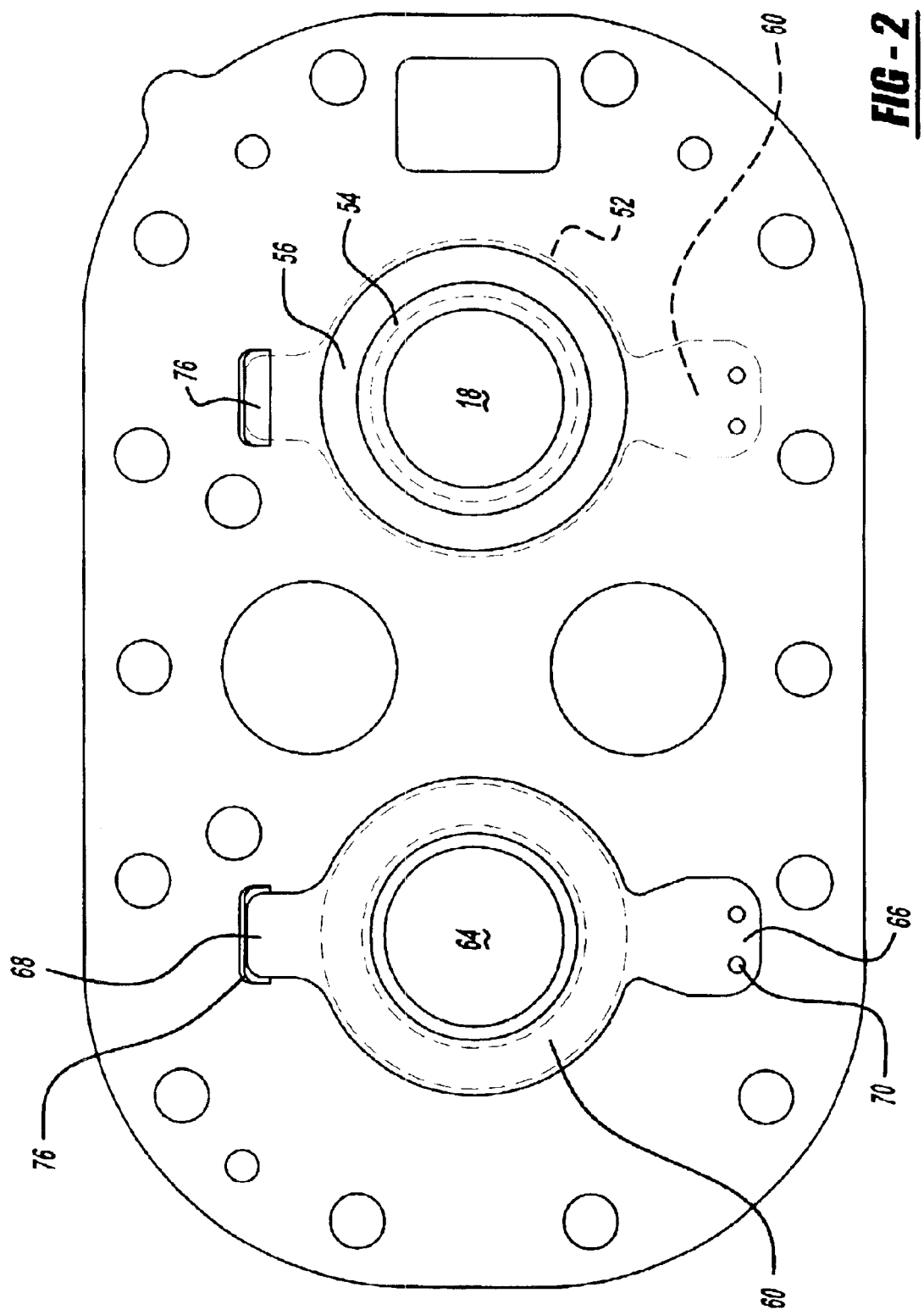
FIG. 2 is a bottom plan view (from inside the cylinder chamber) of the valve plate and reeds from the valve assembly illustrated in FIG. 1 with one cylinder illustrating the suction reed with a dashed line.

Referring now to the drawings in which like reference numerals designate like or corresponding parts throughout the several views, there is illustrated in FIGS. 1 and 2, a valve assembly in accordance with the present invention which is indicated generally by the reference numeral 10. Valve assembly 10 comprises a valve plate assembly 12 having a relatively large irregularly shaped generally annular recessed portion or suction chamber 14 extending into the lower surface 16 thereof. A discharge chamber 18 of frusto conical shape is also provided, being defined by a radially inwardly inclined or beveled sidewall 20 extending between an upper surface 22 and lower surface 16 of valve plate assembly 12. A surface 24 of sidewall 20 provides a valve seat for a discharge valve member 26 which is urged in to sealing engagement therewith by gas pressure and a disc spring 28 extending between valve member 26 and a bridge-like retainer 30.

As shown, discharge valve member 26 is of a size and shape relative to discharge chamber 18 so as to place a lower surface 32 thereof in a substantially coplanar relationship to lower surface 16 of valve plate assembly 12. Spring 28 is located in a recess 36 provided in retainer 30. Discharge valve discharge member 26 is essentially a pressure actuated valve member and spring 28 is chosen primarily to provide stability and also to provide an initial closing bias or preload to establish an initial seal. Other types of springs, other than disc springs may of course be used for this purpose. Retainer 30, which also serves as a stop to limit the opening movement of valve member 26 is secured to valve plate assembly 12 by a pair of suitable fasteners 38.

Valve plate assembly 12 is secured to a compressor body 42 using a plurality of bolts 44 which extend through a compressor head 46, through valve plate assembly 12 and are threadingly received within compressor body 42. A valve plate gasket 48 is disposed between valve plate assembly 12 and compressor body 42 and a head gasket is disposed between valve plate assembly 12 and compressor head 46.

Valve plate assembly 12 defines an annular valve seat 52 and sidewall 20 defines an annular valve seat 54 at its terminal end. Disposed between valve seat 52 and valve seat 54 is a suction input passage 56.

Valve seat 54 of sidewall 20 is positioned in coplanar relationship with valve seat 52 of valve plate assembly 12. A suction reed valve member 60 in the form of an annular ring sealingly engages, in its closed position, valve seat 54 of sidewall 20 and valve seat 52 of valve plate assembly 12 to prevent passage of gas from a compression chamber 62 into suction chamber 14 via input passage 56. A central opening 64 is provided in suction reed valve member 60 and is arranged coaxially with discharge chamber 18 so as to allow direct gas flow communication between compression chamber 62 and lower surface 32 of discharge valve member 26. Suction reed valve member 60 also includes a pair of diametrically opposed radially outwardly extending tabs 66 and 68. Tab 66 is used to secure reed valve member 60 to valve plate assembly 12 using a pair of drive studs 70 bolts or rivets as discussed in greater detail below.

As the reciprocating piston 72 disposed within compression chamber 62 moves away from valve assembly 10 during a suction stroke, the pressure differential between compression chamber 62 and suction chamber 14 will cause suction reed valve member 60 to deflect inwardly with respect to compression chamber 62, to its open position, as shown in dashed lines in FIG. 1, thereby enabling gas flow from suction chamber 14 into compression chamber 62 through input passage 56 disposed between valve seats 52 and 54. Because only tabs 66 and 68 of suction reed valve member 60 extend outwardly beyond the sidewalls of compression chamber 62, suction gas flow will readily flow into compression chamber 62 around substantially the entire inner and outer peripheries of suction reed valve member 60. As a compression stroke of piston 72 begins, suction reed valve member 60 will be forced into sealing engagement with valve seat 54 and valve seat 52. Discharge valve member 26 will begin to open due to the pressure within compression chamber 62 exceeding the pressure within discharge chamber 18 and the force exerted by spring 28. The compressed gas will be forced through central opening 64, past discharge valve member 26 and into discharge chamber 18. The concentric arrangement of valve plate assembly 12 and reed valve member 60 allow substantially the entire available surface area overlying compression chamber 62 to be utilized for suction and discharge valving and porting, thereby allowing maximum gas flow both into and out of compression chamber 62.

The continuous stroking of piston 72 within compression chamber 62 continuously causes suction reed valve member 60 to move between its open and closed positions. Thus, there is a constant bending or flexing of tabs 66 and 68. Compressor body 42 includes an angled or curved portion 74 at the outer edge of compression chamber 62 to provide a friendly surface for tab 68 of suction reed valve member 60 to bend against, thereby significantly reducing the bending stresses generated within tab. Valve plate assembly 12 also includes a shaped recess 76 which allows for the upward movement of tab 68 during the deflection of reed valve member 60.

The present invention is directed to uniquely shaped reed valve member 60 which optimizes both the performance and the durability of reed valve member 60.

Figure 3:
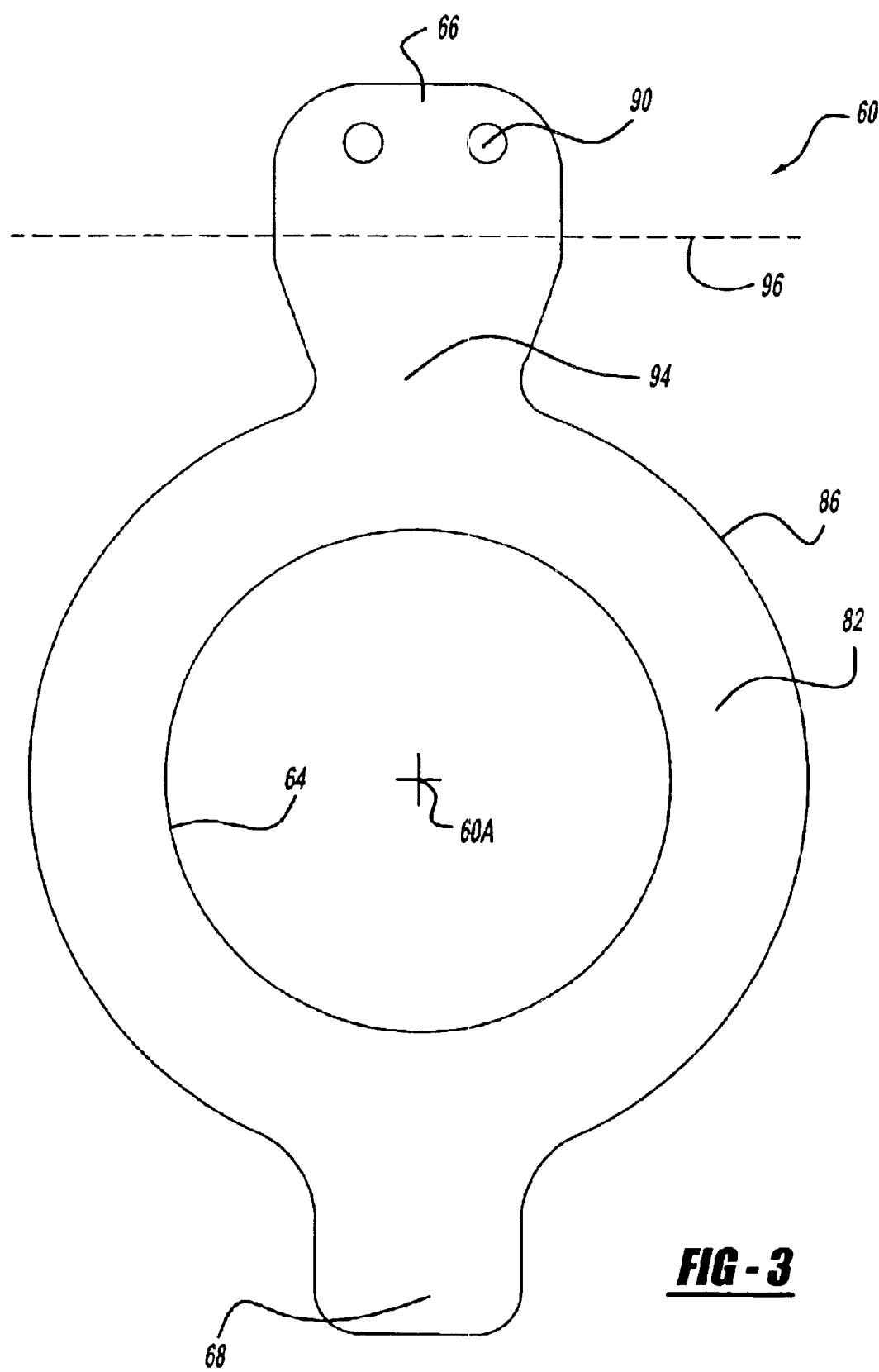
FIG. 3 is a plan view of the reed illustrated in FIGS. 1 and 2.

Reed valve member 60 comprises a central ring shaped body 82 defining reed inside diameter 64 and a reed outside diameter 86. The center point of central ring shaped body 82 defines the center point 60A of reed valve member 60. Fixed tab 66 extends radially outward from ring shaped body 82 and fixed tab 66 defines a pair of holes 90 for securing reed valve member 60 to valve plate assembly 12 using the pair of drive studs, bolts or rivets 70 or other fasteners known in the art. The area between fixed tab 66 and ring shaped body 82 defines a necked down region 94, the dimension of which is optimized for balancing the stress levels for reed valve member 60 without comprising the displacement for reed valve member 60 during the operation of the compressor. As shown in FIG. 3, a clamp line 96 is specifically located with respect to the center of reed valve member 60. The clamp line is a line which abuts an edge of valve plate gasket 48 and thus defines the edge that reed valve member bend on when it flexes during operation of the compressor.

Disposed opposite to the fixed tab 66 is moveable tab 68. Moveable tab 68 is a generally rectangular shaped tab which extends radially outward from ring shaped body 82. As suction reed valve member 60 moves between its open and closed position, moveable tab 68 slides along curved portion 74 at the outer edge of compression chamber 62 to permit the deflection and thus the opening of reed valve member 60. Fixed tab 66 does not slide or bend along the edge of compressor chamber 62 but it bends around the gasket clamp line 96 due to the securing of fixed tab 66 to valve plate assembly 12 by drive studs, bolts or rivets 70. Thus fixed tab 66 bends or deflects along the gasket clamp line 96 with necked down region 94 being dimensioned for balancing the stress levels for reed valve member 60 without compromising the displacement for reed valve member 60 during the operation of the compressor.

In the preferred embodiment, reed valve member 60 has the following dimensions:

Center of reed valve member 60 to clamp line 96=1.771 inches

Width of necked down region 94=0.610 inches

Neck 94 location from Center 60A of reed valve member 60=1.279 inches

Reed OD=2.449 inches

Reed ID=1.628 inches

Reed Material Thickness=0.022 inches

Edge Radius=0.0075 inches

Neck down Radius=0.125 inches

Distance from clamp line to neck down radius=0.084

The above detailed preferred embodiment of reed valve member 60 is designed for a valve plate which has a 2.342 inch OD and a 1.746 inch ID for suction input passage 56.

This provides an overlap of 0.0535 inches or the OD and 0.059 inches for the ID.

The above described reed valve member 60 of valve plate assembly 12 provides at least four advantages. First, it is designed to have low bending stresses in clamp line 96, necked down region 94 and at the mid span locations. Second, it is designed to have low impact stress. Third it is designed to be flexible enough to provide for good gas flow to improve performance. Finally, the design of reed valve member 60 is such that it is optimized to have all these positive attributes so that it has good flexibility while also having good stress resistance.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pressure responsive valve assembly for a compression chamber defined by a cylinder housing, said valve assembly comprising:
    a valve plate defining a discharge chamber and a suction chamber;
    a pressure responsive discharge valve member disposed between said discharge chamber and said compression chamber;
    a pressure responsive suction valve member disposed between said suction chamber and said compression chamber;
    said pressure responsive suction valve member comprising:
    a central ring shaped body having an outer diameter defining a ring width;
    a fixed tab extending radially outward from said central ring shaped body, said fixed tab being secured to said valve plate; and
    a necked down region disposed between said fixed tab and said central ring shaped body, said necked down region having a width which is less than a corresponding width of said fixed tab and which is less than said ring width of said central ring shaped body.

2. The pressure responsive valve assembly according to claim 1 further comprising a movable tab extending radially outward from said central ring shaped body.

3. The pressure responsive valve assembly according to claim 2 wherein said movable tab is generally rectangular.

4. The pressure responsive valve assembly according to claim 2 wherein said movable tab is disposed generally opposite to said fixed tab.

5. The pressure responsive valve assembly according to claim 1 wherein said necked down region is adjacent said central ring shaped body.

6. The pressure responsive valve assembly according to claim 5 further comprising a movable tab extending radially outward from said central ring shaped body.

7. The pressure responsive valve assembly according to claim 6 wherein said movable tab is generally rectangular.

8. The pressure responsive valve assembly according to claim 7 wherein said movable tab is disposed generally opposite to said fixed tab.

9. The pressure responsive valve assembly according to claim 8 wherein said fixed tab defines a clamp line disposed towards said necked down region.

10. The pressure responsive valve assembly according to claim 1 wherein said fixed tab defines a clamp line disposed towards said necked down region.

11. A pressure responsive valve assembly for a compression chamber defined by a cylinder housing, said valve assembly comprising;
    a valve plate defining a discharge chamber and a suction chamber;
    a pressure responsive discharge valve member disposed between said discharge chamber and said compression chamber;
    a pressure responsive suction valve member disposed between said suction chamber and said compression chamber;
    said pressure responsive suction valve member comprising:
    a central ring shaped body having an outer diameter defining a ring width;
    a fixed tab extending radially outward from said central ring shaped body, said fixed tab being secured to said valve plate;
    a necked down region disposed between said fixed tab and said central ring shaped body, said necked down region having a width which is less than a corresponding width of said fixed tab and which is less than said ring width of said central ring shaped body; and
    a movable tab extending radially outward from said central ring shaped body, said movable tab being generally rectangular and disposed circumferentially opposite to said fixed tab.

12. The pressure responsive valve assembly according to claim 11 wherein said necked down region is adjacent said central ring shaped body.

13. The pressure responsive valve assembly according to claim 12 wherein said fixed tab defines a clamp line disposed towards said necked down region.

14. The pressure responsive valve assembly according to claim 11 wherein said fixed tab defines a clamp line disposed towards said necked down region.

\* \* \* \* \*

UNITED STATES PATENT AND TRADEMARK OFFICE
CERTIFICATE OF CORRECTION

PATENT NO. : 6,823,891 B2
DATED : November 30, 2004
INVENTOR(S) : Scott D. Schulze et al.

Column 1,
Line 31, "import" should be -- important --.
Line 34, "complimentary" should be -- complementary --.

Column 2,
Line 65, "in to" should be -- into --.

Column 3,
Line 6, after "valve" delete "discharge".

Column 5,
Line 1, "or" should read -- for --.

Signed and Sealed this

Nineteenth Day of April, 2005

JON W. DUDAS
*Director of the United States Patent and Trademark Office*